US010368320B2

(12) United States Patent
Yu et al.

(10) Patent No.: US 10,368,320 B2
(45) Date of Patent: Jul. 30, 2019

(54) INITIAL SETTING AND CONFIGURATION OF E-UTRAN FOR ENERGY-EFFICIENT IOPS

(71) Applicant: NOKIA SOLUTIONS AND NETWORKS OY, Espoo (FI)

(72) Inventors: Ling Yu, Kauniainen (FI); Vinh Van Phan, Oulu (FI); Kari Veikko Horneman, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/564,059

(22) PCT Filed: Apr. 7, 2015

(86) PCT No.: PCT/EP2015/057466
§ 371 (c)(1),
(2) Date: Oct. 3, 2017

(87) PCT Pub. No.: WO2016/162046
PCT Pub. Date: Oct. 13, 2016

(65) Prior Publication Data
US 2018/0098290 A1    Apr. 5, 2018

(51) Int. Cl.
*H04W 52/32* (2009.01)
*H04W 52/24* (2009.01)
(Continued)

(52) U.S. Cl.
CPC ....... *H04W 52/325* (2013.01); *H04W 52/241* (2013.01); *H04W 52/46* (2013.01);
(Continued)

(58) Field of Classification Search
CPC ............. H04W 52/241; H04W 52/244; H04W 52/283; H04W 52/325; H04W 52/343; H04W 52/367; H04W 52/46
(Continued)

(56) References Cited

U.S. PATENT DOCUMENTS

2008/0259802 A1* 10/2008 Pedersen ............... H04L 5/0037
370/235
2011/0149769 A1* 6/2011 Nagaraja ............... H04W 52/12
370/252
(Continued)

FOREIGN PATENT DOCUMENTS

EP    2 563 078 A1    2/2013
EP    2 654 335 A1    10/2013
(Continued)

OTHER PUBLICATIONS

International Search Report & Written Opinion dated Dec. 10, 2015 corresponding to International Patent Application No. PCT/JP2015/057466.
(Continued)

*Primary Examiner* — Shaima Q Aminzay
(74) *Attorney, Agent, or Firm* — Squire Patton Boggs (US) LLP

(57) ABSTRACT

Initial Setting and Configuration of E-UTRAN for Energy-Efficient IOPS Certain embodiments of the invention generally relate to initial setting and configuration of E-UTRAN for energy-efficient isolated E-UTRAN operation for public safety. A method may include determining an initial configuration mode of a network element for setting up a self-controlled radio access network. The method may also include determining an initial downlink transmission power of the network element coupled with the determined initial configuration mode. The method may further include detecting a need of changing downlink transmission power of the
(Continued)

network element based on at least one of traffic demands and conditions of the self-controlled radio access network. The method may also include determining a new downlink transmission power. The method may further include indicating the change of at least one of the downlink transmission power and the initial configuration mode to at least one user equipment.

21 Claims, 4 Drawing Sheets

(51) Int. Cl.
*H04W 52/46* (2009.01)
*H04W 52/28* (2009.01)
*H04W 52/34* (2009.01)
*H04W 52/36* (2009.01)

(52) U.S. Cl.
CPC ........ *H04W 52/244* (2013.01); *H04W 52/283* (2013.01); *H04W 52/343* (2013.01); *H04W 52/367* (2013.01)

(58) Field of Classification Search
USPC ........................................................ 455/522
See application file for complete search history.

(56) References Cited

U.S. PATENT DOCUMENTS

| | | | | |
|---|---|---|---|---|
| 2013/0072211 A1* | 3/2013 | Cai | ................. | H04W 52/143 |
| | | | | 455/452.1 |
| 2013/0252620 A1* | 9/2013 | Kobayashi | .......... | H04W 52/325 |
| | | | | 455/446 |
| 2015/0063223 A1* | 3/2015 | Shen | ................. | H04W 52/265 |
| | | | | 370/329 |

FOREIGN PATENT DOCUMENTS

GB           2 450 123 A      12/2008
WO     WO 2016/114762 A1     7/2016

OTHER PUBLICATIONS

3GPP TS 22.346 V13.0.0 (Sep. 2014), Technical Specification, 3rd Generation Partnership Project; Technical Specification Group Services and System Aspects; Isolated Evolved Universal Terrestrial Radio Access Network (E-UTRAN) operation for public safety; Stage 1 (Release 13), Sep. 2014.
Katrin Erlinghagen et al., "Dynamic Cell Size Adaptation and Intercell Interference Coordination in LTE HetNets," IEEE, 2013.
Cell breathing (telephone) from Wikipedia http://en.wikipedia.org/wiki/Cell_breathing_(telephony).

* cited by examiner

INITIAL SETTING AND CONFIGURATION OF E-UTRAN FOR ENERGY-EFFICIENT IOPS

BACKGROUND

Field

Embodiments of the invention generally relate to mobile communications networks, such as, but not limited to, the Universal Mobile Telecommunications System (UMTS) Terrestrial Radio Access Network (UTRAN), Long Term Evolution (LTE) Evolved UTRAN (E-UTRAN). For example, some embodiments relate to initial setting and configuration of E-UTRAN for energy-efficient isolated E-UTRAN operation for public safety (IOPS).

Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node-Bs. The RNC and its corresponding Node-Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and multimedia transport in addition to high-capacity voice support. Advantages of LTE include, for example, high throughput, low latency, FDD and TDD support in the same platform, an improved end-user experience, and a simple architecture resulting in low operating costs. In addition, LTE is an all internet protocol (IP) based network, supporting both IPv4 and Ipv6.

SUMMARY

One embodiment is directed to a method that may include determining an initial configuration mode of a network element for setting up a self-controlled radio access network. The method may also include determining an initial downlink transmission power of the network element coupled with the determined initial configuration mode. The method may further include detecting a need of changing downlink transmission power of the network element based on at least one of traffic demands and conditions of the self-controlled radio access network. The method may also include determining a new downlink transmission power. The method may further include indicating at least one of the change of downlink transmission power and the initial configuration mode to at least one user equipment.

In an embodiment, the method may further include, when the initial configuration mode is a first mode, determining to boost the downlink transmission power of the network element when the relayed traffic demands are larger than a pre-defined threshold, wherein the first mode comprises a user equipment-to-network relay. In another embodiment, the method may include sending a request to a relay user equipment for a report of conditions of a channel between the relay user equipment and a relayed user equipment, receiving the report of channel conditions from the relay user equipment, and setting an amount of the downlink transmission power of the network element to be boosted based on the report of channel conditions.

In an embodiment, the report may include at least one of information of all relayed user equipment, or information of the relayed user equipment with the worst channel condition or with the highest amount of traffic. In another embodiment, the request may be sent to all the relay user equipment with common control signaling, or to the relay user equipment that relay the highest amount of traffic with dedicated control signaling.

In an embodiment, the method may also include, when the initial configuration mode is a second mode, determining to downgrade the downlink transmission power of the network element based on a detected number of user equipment in a cell edge. Further, in an embodiment, the second mode may include a direct access to a self-controlled radio access network for a control plane connection and a direct proximity service communication for a user plane connection.

In an embodiment, the method may further include downgrading the downlink transmission power of the network element when the number of user equipment in the cell edge is lower than a pre-configured threshold. In another embodiment, the number of user equipment in the cell edge may be based on a number of accessed or connected user equipment which have a large uplink timing advance value, or a number of user equipment that report reference signal received power measurements based on the network element configuration.

In an embodiment, the indicating further includes indicating at least one of a downlink transmission power degrading or boosting indication, cell access information and user equipment relay information to at least one user equipment. In an embodiment, the method also includes, when the initial configuration mode is a third mode, alternating between boosting and downgrading the downlink transmission power of the network element when the network element detects that an energy saving is achievable, and maintaining the current operation mode in a case of an existing network element having a broken backhaul connection.

In an embodiment, the network element may be initially configured with a pre-configured minimum downlink transmission power if the first mode is configured, a pre-configured maximum downlink transmission power if the second mode is configured, or a pre-configured downlink transmission power in-between the pre-configured minimum or maximum downlink transmission power if the third mode is configured. In another embodiment, the initial configuration mode is determined based on an environment that the network element is operating in.

Another embodiment is directed to an apparatus that includes at least one processor, and at least one memory including computer program code. The at least one memory and the computer program code may be configured, with the at least one processor, to cause the apparatus at least to determine an initial configuration mode of a network element for setting up a self-controlled radio access network. The at least one memory and the computer program code may also be configured, with the at least one processor, to cause the apparatus at least to determine an initial downlink transmission power of the network element coupled with the determined initial configuration mode. The at least one memory and the computer program code may further be configured, with the at least one processor, to cause the apparatus at least to detect a need of changing downlink transmission power of the network element based on at least one of traffic demands and conditions of the self-controlled radio access network. The at least one memory and the computer program code may also be configured, with the at least one processor, to cause the apparatus at least to determine a new downlink transmission power. The at least one memory and the computer program code may further be configured, with the at least one processor, to cause the apparatus at least to indicate at least one of the change of downlink transmission power and the initial configuration mode to at least one user equipment.

Another embodiment is directed to an apparatus that may include determining means for determining an initial configuration mode of a network element for setting up a self-controlled radio access network. The apparatus may also include determining means for determining an initial downlink transmission power of the network element coupled with the determined initial configuration mode. The apparatus may further include detecting means for detecting a need of changing downlink transmission power of the network element based on at least one of traffic demands and conditions of the self-controlled radio access network. The apparatus may also include determining means for determining a new downlink transmission power. The apparatus may further include indicating means for indicating the change of downlink transmission power and the initial configuration mode to at least one user equipment.

In an embodiment, the apparatus may also include, when the initial configuration mode is a first mode, determining means for determining to boost the downlink transmission power of the network element when the relayed traffic demands are larger than a pre-defined threshold, wherein the first mode comprises a user equipment-to-network relay. In another embodiment, the apparatus may include sending means for sending a request to a relay user equipment for a report of channel conditions of a channel between the relay user equipment and a relayed user equipment, receiving means for receiving the report of channel conditions from the relay user equipment, and setting means for setting an amount of the downlink transmission power of the network element to be boosted based on the report of channel conditions.

In an embodiment, the report may include at least one of information of all relayed user equipment, or information of the relayed user equipment with the worst channel condition or with the highest amount of traffic. In another embodiment, the request may be sent to all the relay user equipment with common control signaling, or to the relay user equipment that relay the highest amount of traffic with dedicated control signaling.

In an embodiment, the apparatus further includes, when the initial configuration mode is a second mode, determining means for determining to downgrade the downlink transmission power of the network element based on a detected number of user equipment in a cell edge. In an embodiment, the second mode may include a direct access to a self-controlled radio access network for a control plane connection and a direct proximity service communication for a user plane connection.

In an embodiment, the apparatus may also include downgrading means for downgrading the downlink transmission power of the network element when the number of user equipment in the cell edge is lower than a pre-configured threshold. In another embodiment, the number of user equipment in the cell edge may be based on a number of accessed or connected user equipment which have a large uplink timing advance value, or a number of user equipment that report reference signal received power measurements based on the network element configuration.

In an embodiment, the indicating means may further include indicating a downlink transmission power degrading indication and user equipment relay information to a remote user equipment. In another embodiment, the apparatus may also include, when the initial configuration mode is a third mode, alternating means for alternating between boosting and downgrading the downlink transmission power of the network element when the network element detects that an energy saving is achievable, and maintaining means for maintaining the current operation mode in a case of an existing network element having a broken backhaul connection.

In an embodiment, the network element may be initially configured with a pre-configured minimum downlink transmission power if the first mode is configured, a pre-configured maximum downlink transmission power if the second mode is configured, or a pre-configured downlink transmission power in-between the pre-configured minimum or maximum downlink transmission power if the third mode is configured. In another embodiment, the initial configuration mode may be determined based on an environment that the network element is operating in.

In an embodiment, a computer program, may be embodied on a non-transitory computer readable medium, the computer program configured to control a processor to perform the method described above.

BRIEF DESCRIPTION OF THE DRAWINGS

For proper understanding of the invention, reference should be made to the accompanying drawings, wherein.

DETAILED DESCRIPTION

Figure 1:
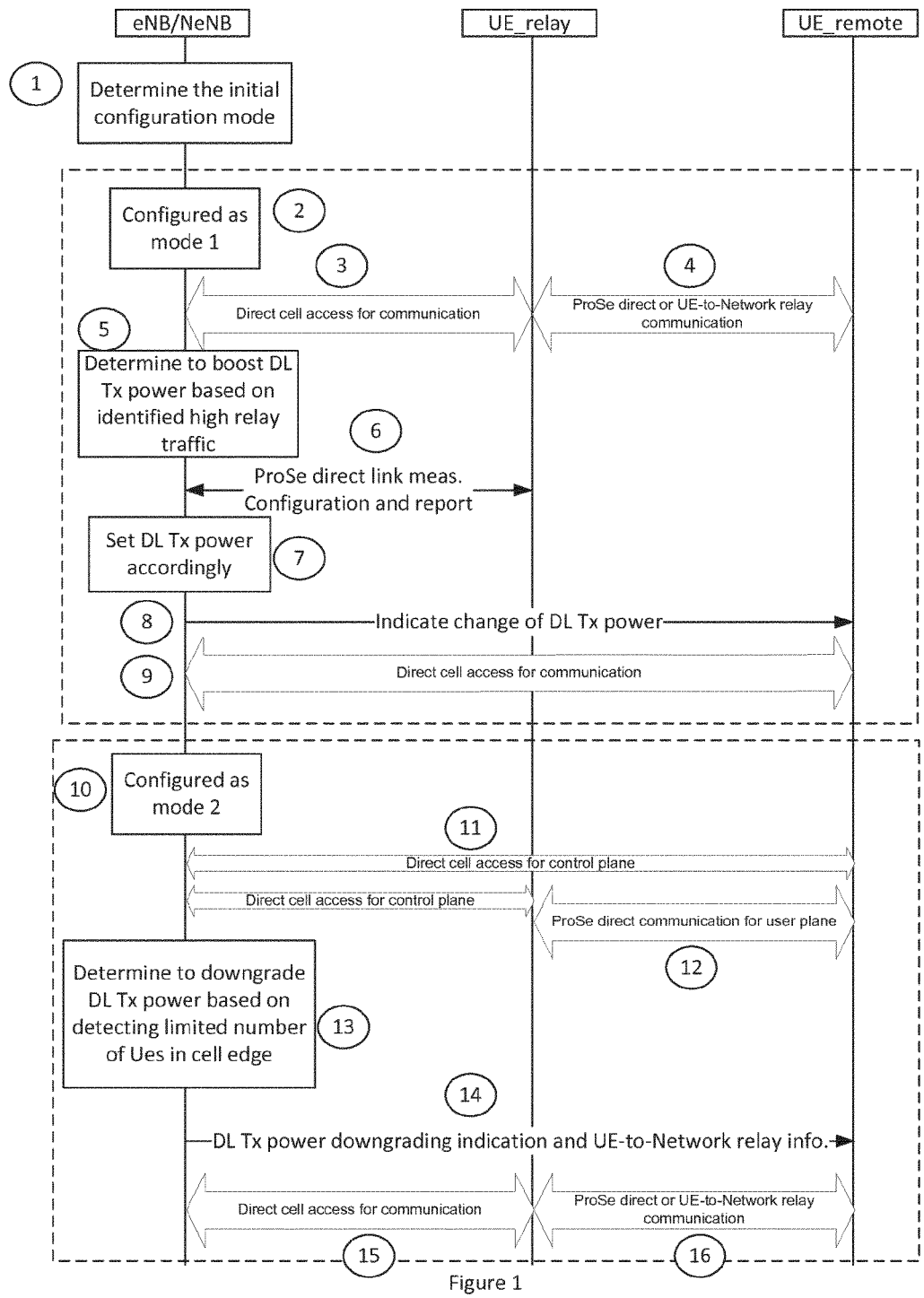
FIG. 1 illustrates a signaling flow diagram, according to certain embodiments.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

A nomadic EnodeB (NeNB) is a nomadic cell and may consist of a base station, antennas, microwave backhaul and support for local services. Generally, the NeNB is intended for public safety use providing coverage or additional capacity where: 1) coverage was never present (e.g. forest fire or underground rescue) or 2) where, for example, due to natural disaster coverage is no longer present.

An isolated E-UTRAN may represent either an E-UTRAN without normal connectivity with the evolved packet core (EPC) or deployed NeNBs with E-UTRAN functionality. Further, isolated E-UTRAN operation may include two situations: 1) In the event of an interruption to normal backhaul connectivity Isolated E-UTRAN operation aims to adapt to the failure and maintain an acceptable level of network operation in the isolated E-UTRAN. The restoration of service is the eventual goal; and 2) Operation following the deployment of one or more NeNBs either without backhaul or with limited backhaul.

Ensuring the continued ability of public safety users to communicate within mission critical situations may be important. The isolated E-UTRAN mode of operation may provide the ability to maintain a level of communications for public safety users, via an eNB (or set of connected eNBs), following the loss of backhaul communications. The isolated E-UTRAN mode of operation may also provide the ability to create a serving radio access network without backhaul communications, from a deployment of one or more standalone NeNBs. In addition, the isolated EUTRAN feature also addresses the scenario where a fixed or nomadic set of eNBs is without normal backhaul communications but has been provided with an alternative (non-ideal) limited bandwidth backhaul.

An isolated E-UTRAN may include a deployment of one or more NeNBs. In certain cases, operator control may initiate isolated E-UTRAN operation for a group of NeNBs in a given incident area. An isolated E-UTRAN derived from NeNBs may exhibit similar behavior to an isolated E-UTRAN derived from eNBs including: support for public safety UEs in the coverage area, communication between NeNBs and support for limited backhaul connectivity.

The isolated E-UTRAN may also include a single or multiple eNBs, a single or multiple NeNBs, or a mixed group of eNBs and NeNBs. An isolated E-UTRAN including multiple (N)eNBs, with connections between the (N)eNBs, can provide communication between UEs across a wider area of coverage than can be provided by a single isolated (N)eNB. The UEs in the coverage of the isolated E-UTRAN are able to continue communicating and provide a restricted set of services supporting voice, data and group communications, to their public safety users.

Additionally, the isolated E-UTRAN may be characterized by having no, or a limited, backhaul connection. In particular, the isolated E-UTRAN feature may enable services to be provided to public safety UEs in the following backhaul scenarios: 1) no backhaul; 2) limited bandwidth signaling backhaul; and 3) limited bandwidth signaling and user data backhaul.

The power consumption on operating IOPS may be one of the essential requirements for IOPS system design, as both serving eNB and public safety (PS) UE in IOPS may have to rely on mobile battery power. This may be the case in many situations of PS in which regular electricity supply over PS mission critical service areas of natural or manmade disasters is cut or not available. This may also be expected when using NeNB. It may be highly desirable to have IOPS configured and operated in the most power efficient way so that the communication in mission critical situations can last as long as possible even without an electricity supply.

Proximity service (ProSe) device to device (D2D) communications which have been initially standardized for PS usage may be effective means and likely to be used for mission critical situations of PS. Thus, there may be a tight mutual support for both IOPS and ProSe D2D, including IOPS support for ProSe D2D under the isolated E-UTRAN coverage as well as the selection and use of IOPS and ProSe D2D in a smart and efficient way.

Certain embodiments of the present invention may focus on energy efficient solutions, and may provide a method for initial setting and configuration of IOPS with new triggers on initial configuration or reconfiguration of (N)eNB(s) involved in providing IOPS operation. Certain embodiments may also provide a corresponding signaling mechanism, taking into account a mutual support and tight relation of IOPS and ProSe D2D.

Support for energy saving in 3GPP E-UTRAN may allow, for example, in a deployment where cells of capacity boosters can be distinguished from cells providing basic coverage, to optimize energy consumption enabling the possibility for an E-UTRAN cell providing additional capacity, to be switched off when its capacity is no longer needed and to be re-activated on a need basis. The solution provided in 3GPP E-UTRAN focuses on enabling cell switch on/off, the indication of cell on/off to the neighboring cells as well as network initiated handover in order to off-load the cell being switched off. However, such a power saving solution may not always be applicable for IOPS operation, for example, when a single eNB/NeNB is deployed.

Dynamic change of cell size or cell breathing investigated the issue mainly from interference coordination or load balancing perspective. Cell breathing is mainly achieved by adjusting the cell selection offset or handover related parameters. However, energy efficiency was not the focus/target in dynamic change of cell size or cell breathing.

Certain embodiments of the present invention propose new triggers and configurations as well as related signaling mechanisms for initial setting and controlling of IOPS in which the serving eNB may be a mobile NeNB brought to the site or an existing eNB at the site that happened to lose its S1/X2 connection towards the core network or other eNBs.

In one embodiment, the initial setting and configuration of the eNB for IOPS operation may be determined in one of the following three modes, referred to as mode 1, mode 2 and mode 3.

In mode 1, the eNB may be initially configured to start IOPS operation with a pre-configured minimum downlink (DL) transmission (Tx) power. Some of the PS UEs that are in the coverage of low power IOPS cell may access the isolated E-UTRAN directly. The directly accessed/connected PS UEs may be configured as ProSe UE-to-network relay, and other PS UEs may access the isolated E-UTRAN via ProSe UE-to-network relay functions.

In mode 2, the eNB may initially be configured to start IOPS operation with a pre-configured maximum DL Tx power. However, the isolated E-UTRAN access functions may only initially be configured for control plane connections of the PS UEs (including possible physical layer (PHY) and media access control (MAC)) signaling to support relevant eNB scheduling operation). The actual user plane transmission for PS UEs may be configured via ProSe D2D communication.

In mode 3, the eNB may initially be configured to start IOPS operation with pre-configured DL Tx power. Further configuration and operation may be as either mode 1 or mode 2, or some combination or extension of mode 1 and/or mode 2. This mode may be introduced for a flexible and robust initial setting and configuration of IOPS, primarily aimed for the case in which the serving eNB of IOPS is an existing eNB at the site that happened to lose its S1/X2 connection towards the core network and needed to reconfigure itself for providing IOPS. In this case, the eNB may maintain the current DL Tx Power for initial operation of IOPS.

In an embodiment, the selection of initial operation mode 1, 2 or 3 may be determined based on the deployment environment that IOPS will be operated. For instance, if IOPS is operated in an indoor scenario where the service area are separated by many walls, mode 1 or mode 3 might be configured as using UE-to-network relay for more energy efficiency than providing direct access to the whole area due to, for example, wall attenuation. Further, if IOPS is operated in an open area, mode 2 or mode 3 may be configured so that IOPS coverage can be as large as possible with less consumption of (N)eNB power.

According to other embodiments, the selection and configuration of the initial IOPS operation mode may also be based on other attributes. For example, if the serving eNB is an NeNB, then either mode 1 or mode 2 may be selected. Further, if the serving eNB is an on-the-fly self-configured existing eNB, then mode 3 may be selected. Additionally, if the anticipated number of PS UEs that IOPS will serve is high, initial IOPS operation mode 2 or mode 3 may be configured so that network scheduled resource allocation may be used for ProSe D2D communication instead of autonomous resource allocation which may not work well in a dense ProSe/D2D UEs case. Further, if the serving eNB has some limited IP backhaul connection to the public Internet available for providing, for example, IP access for PS UEs to the public Internet, then mode 1 or mode 3 may be configured.

In an embodiment, new triggers and signaling mechanisms to reconfigure eNB DL Tx power of the serving eNB for IOPS operation after the initial setting and configuration may be provided.

In the case of mode 1, changing/boosting of eNB DL Tx power may be triggered by the serving eNB detecting that the relayed traffic is larger than a pre-defined threshold so that the changing/boosting of eNB DL Tx power can allow more PS UEs to access the IOPS serving cell directly. The trigger may be cell specific, which means that the overall relayed traffic by all of the UE-to-network relay UEs are counted. Or the trigger may be the UE-to-network relay UE specific, which means the relayed traffic from each UE-to-network relay UE in the IOPS cell are counted separately and may trigger the change/boosting of eNB DL Tx power. The amount of relayed traffic may be counted as the overall bit rates or the number of resource blocks for transmitting the traffic. Alternatively, in an embodiment, the amount of relayed traffic may be counted as relative to the overall cell capacity for cell specific trigger option or be counted as relative to UE capability of handling the traffic for UE specific trigger option.

In order to determine the right DL Tx power when the serving eNB triggers the change of eNB DL Tx power, the serving eNB may request the UE-to-network relay UEs to report the channel conditions, between the relay UEs and the relayed UEs. The request may be sent to all UE-to-network relay UEs with common control signaling, or sent to the UE-to-network relay UEs that relayed the highest amount of traffic with dedicated control signaling. The report of the channel conditions may include information of all the relayed UEs or include only the relayed UEs with worst channel condition or with highest amount of traffic towards the UE-to-network relay UE. The relayed/remote UEs may be informed for the change of DL Tx power via UE-to-network relay UEs so that relayed/remote UEs can prepare for direct access to the cell after DL Tx power has changed/boosted.

In the case of mode 2, changing/decreasing of eNB DL Tx power may be triggered by the serving eNB detecting that energy saving may be achieved by the use of UE-to-network relay features coupled with the need of direct cellular access for the user plane. The detection may be based on the number of accessed/connected PS UEs which have a large UL timing advance value (for example, the timing advance is larger than a certain pre-configured threshold), or the number of PS UEs that report reference signal received power (RSRP) measurement based on eNB configuration (for example, the serving eNB may configure UEs to report RSRP if RSRP is lower than a certain threshold).

If the identified number of PS UEs is lower than pre-configured threshold, which may be either an absolute value or relative value to the total number of UEs in the cell, the serving eNB may determine to lower the DL Tx power and configure some UEs in the cell to act as UE-to-network relay so that the limited number of PS UEs in the current cell edge may be served with UE-to-network relay after the DL Tx power is downgraded. The determination may also take into account the amount of traffic that the impacted UEs are served. Thus, to ensure the service continuity of the impacted UEs, the serving eNB may indicate the DL Tx power change and also the information of ProSe UE-to-network relay with either common or dedicated signaling to the impacted UEs.

In the case of mode 3, the change (boosting/decreasing) of eNB DL Tx power may be triggered by the serving eNB detecting that energy saving may be achieved by leaning toward mode 2, and also leaning toward mode 1 based on monitoring PS traffic demands and conditions in the cell. This can be seen as a reversed direction of the above changes in mode 1 and mode 2 toward mode 3.

According to certain embodiments, the remaining battery power level of the serving eNB may be taken into account when considering changing eNB Tx Power. Further, the initial configuration of IOPS operation may be from operation and management (O&M) if available, or eNB self-configuration based on pre-configured rules and input parameters via, for example, a human machine interface (HMI). Upon reconfiguration of the DL Tx power, the operation of mode 1, mode 2 and mode 3 may not be clearly exclusive with each other anymore. Therefore, the triggers and corresponding signaling mechanism(s) may be applied for reconfiguration in any applicable cases regardless of the initial operation mode.

FIG. 1 illustrates a signaling flow diagram, according to certain embodiments. At 1, the eNB/NeNB may determine the initial setting and/or configuration for IOPS operation according to a particular mode. For instance, the mode may correspond to mode 1, mode 2 or mode 3, as previously described. In an embodiment, at 2, the eNB/NeNB may be configured as mode 1, and be initially configured to start IOPS operation with a pre-configured minimum DL Tx power. In another embodiment, mode 1 may include a UE-to-network relay to provide the services for the remote UEs out of IOPS cell coverage. At 3, a PS UE that is in the coverage of the IOPS cell may have direct cell access to the eNB/NeNB for communication. The directly accessed/connected UE may be also configured as a UE-to-network relay UE. At 4, the IOPS cell access service may be provided to a remote UE by allowing it to access the IOPS serving cell or the isolated E-UTRAN via the UE-to-network relay UE. Or the remote UEs and UE-to-Network relay UEs may use end-to-end ProSe direct communication.

At 5, the eNB/NeNB may determine to boost the DL Tx power based on identifying/detecting that the relayed traffic is higher than a pre-defined threshold so that the change/boost of eNB/NeNB DL Tx power can allow more PS UEs, including the remote/relayed UEs, to access the IOPS serving cell directly. At 6, the eNB/NeNB may send a request to the relay UE to report channel conditions towards the remote/relayed UE. In response, the relay UE may send reports of channel conditions to the eNB/NeNB.

In an embodiment, the request may be sent to all relay UEs with common control signaling. In another embodiment, the request may be sent to the relay UEs that relay the highest amount of traffic with dedicated control signaling. Further, the report may include information of all of the relayed UEs or include only the relayed UEs with the worst channel condition or with the highest amount of traffic towards the UE-to-network relay UE.

At 7, the eNB/NeNB may set the DL Tx power according to the reports received from the UE-to-network relay UE. At 8, the eNB/NeNB may send an indication of power boosting of the downlink transmission power to the remote UEs via the relay UE to allow the remote UE to have a quick access to eNB/NeNB directly. The power boosting indication message may also include cell access related information, for example the system information of the IOPS cell, the RACH related information like RACH preambles and even the UL scheduling related information so that remote UE can use those information to access IOPS cell directly as long as remote UE detects the cell after DL Tx power has boosted. At 9, direct cell access for communication may be established between the eNB/NeNB and the remote UE as a result of the change/boost in DL Tx power.

According to another embodiment, at 10, the eNB/NeNB may be configured as mode 2, and be initially configured to start IOPS operation with a pre-configured maximum DL Tx power. In an embodiment, mode 2 may include a direct access between UE and eNB/NeNB only for a control plane and a direct proximity service communication between UEs for a user plane. At 11, all the UEs may establish a direct cell access control plane connection with the eNB/NeNB. Further, at 12, the UEs that established direct control plane connection with the eNB/NeNB may establish a direct ProSe communication for a user plane connection under the control of eNB/NeNB.

At 13, the eNB/NeNB may determine to downgrade the DL Tx power based on detecting a limited number of UEs in the cell edge. In other words, the eNB/NeNB may be triggered to downgrade DL Tx power when the eNB/NeNB detects that energy saving may be achieved by the use of UE-to-network relay features coupled with the need for direct cellular access for the user plane. In an embodiment, the detection may be based on the number of accessed/connected PS UEs which have a large UL timing advance value, including, for example, when the timing advance is larger than a certain predetermined threshold. Alternatively, the detection may be based on the number of PS UEs that report RSRP measurement based on eNB configuration, including, for example, when the serving eNB/NeNB configures UEs to report RSRP if RSRP is lower than a certain threshold. If the identified number of PS UEs is lower than the pre-configured threshold, the serving eNB/NeNB may determine to lower the DL Tx power.

At 14, a DL Tx power downgrading indication may be sent from the eNB/NeNB to the selected UEs that may become remote UEs (i.e., out of IOPS cell coverage) after DL Tx power downgrading. The UE selection may be based on, for example, the UL timing advance information or RSRP report. The DL Tx power downgrading indication may also include UE-to-network relay UEs information to facilitate the remote UEs to find UE-to-network relay UEs for indirect access via UE-to-network relay UEs. As a result, at 15, the eNB/NeNB may configure one or more PS UEs that have the direct cell access to the eNB/NeNB to act as UE-to-network relay UEs. Further, at 16, the remote UE may access the IOPS serving cell (eNB/NeNB) or the isolated E-UTRAN, via the UE-to-Network relay UEs for eNB/NeNB involved communication or have end-to-end direct ProSe communication without eNB/NeNB involvement.

In an embodiment, the eNB/NeNB may be configured as mode 3 (not shown), which, as previously discussed, may be initially configured to start IOPS operation with a pre-configured DL Tx power. Under mode 3, the configuration and operation of the eNB/NeNB may be as either mode 1 or mode 2, or some combination or extension of mode 1 and/or mode 2. After the initial setting and configuration as mode 3, a change (boosting/decreasing) of eNB/NeNB DL Tx power may be triggered by the serving eNB/NeNB detecting that energy saving may be achieved by leaning toward mode 2 or mode 1, based on monitoring PS traffic demands and conditions in the cell. Further, in an embodiment, in mode 3, the eNB/NeNB may maintain the current operation mode in a case of an existing network element having a broken backhaul connection.

Figure 2:
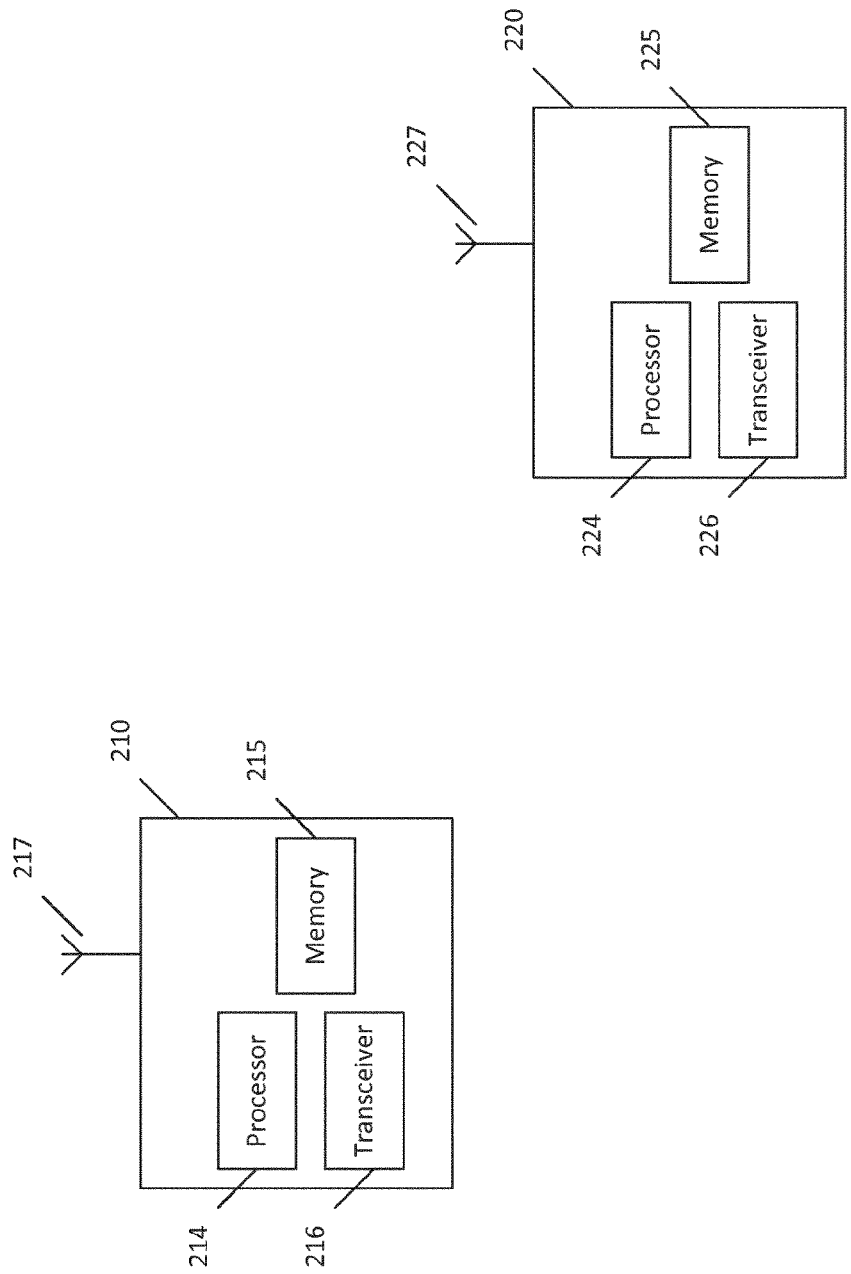
FIG. 2 illustrates a system, according to certain embodiments.

FIG. 2 illustrates an example of a system according to certain embodiments. In one embodiment, a system may include multiple devices, such as, for example, at least one apparatus 210 and at least one network element 220 or other base station or access point.

The apparatus 210 can be any terminal device, such as a UE, a cell phone, a smart phone, a personal digital assistant, a tabletop computer, a personal computer, a laptop computer, a mini-tablet computer, a tablet computer, or the like. According to certain embodiments, the apparatus 210 may be a PS UE, ProSe UE-to-network UE or relay UE, a remote UE, or similar device. Further, the network element 220 can be, a base station, access point, eNB, NeNB or other similar device.

Each of these devices may include at least one processor, respectively indicated as 214 and 224. At least one memory can be provided in each device, and indicated as 215 and 225, respectively. The memory may include computer program instructions or computer code contained therein. The processors 214 and 224 and memories 215 and 225, or a subset thereof, can be configured to provide means corresponding to the various blocks and processes shown in FIGS. 1, 4 and 5.

As shown in FIG. 2, transceivers 216 and 226 can be provided, and each device may also include an antenna, respectively illustrated as 217 and 227. Other configurations of these devices, for example, may be provided as well.

Transceivers 216 and 226 can each, independently, be a transmitter, a receiver, or both a transmitter and a receiver, or a unit or device that is configured both for transmission and reception. For example, the transceivers 216 and 226 may be configured to modulate information onto a carrier waveform for transmission by the antennas 217 and 227, and demodulate information received via the antennas 217 and 227 for further processing by other elements of the system shown in FIG. 2. In other embodiments, transceivers 216 and 226 may be capable of transmitting and receiving signals or data directly.

Processors 214 and 224 can be embodied by any computational or data processing device, such as a central processing unit (CPU), application specific integrated circuit (ASIC), or comparable device. The processors can be implemented as a single controller, or a plurality of controllers or processors. The processors may also perform functions associated with the operation of the system including, without limitation, precoding of antenna gain/phase parameters, encoding and decoding of individual bits forming a communication message, formatting of information, and overall control of the system, including process related to management of communication resources.

Memories 215 and 225 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

Figure 4:
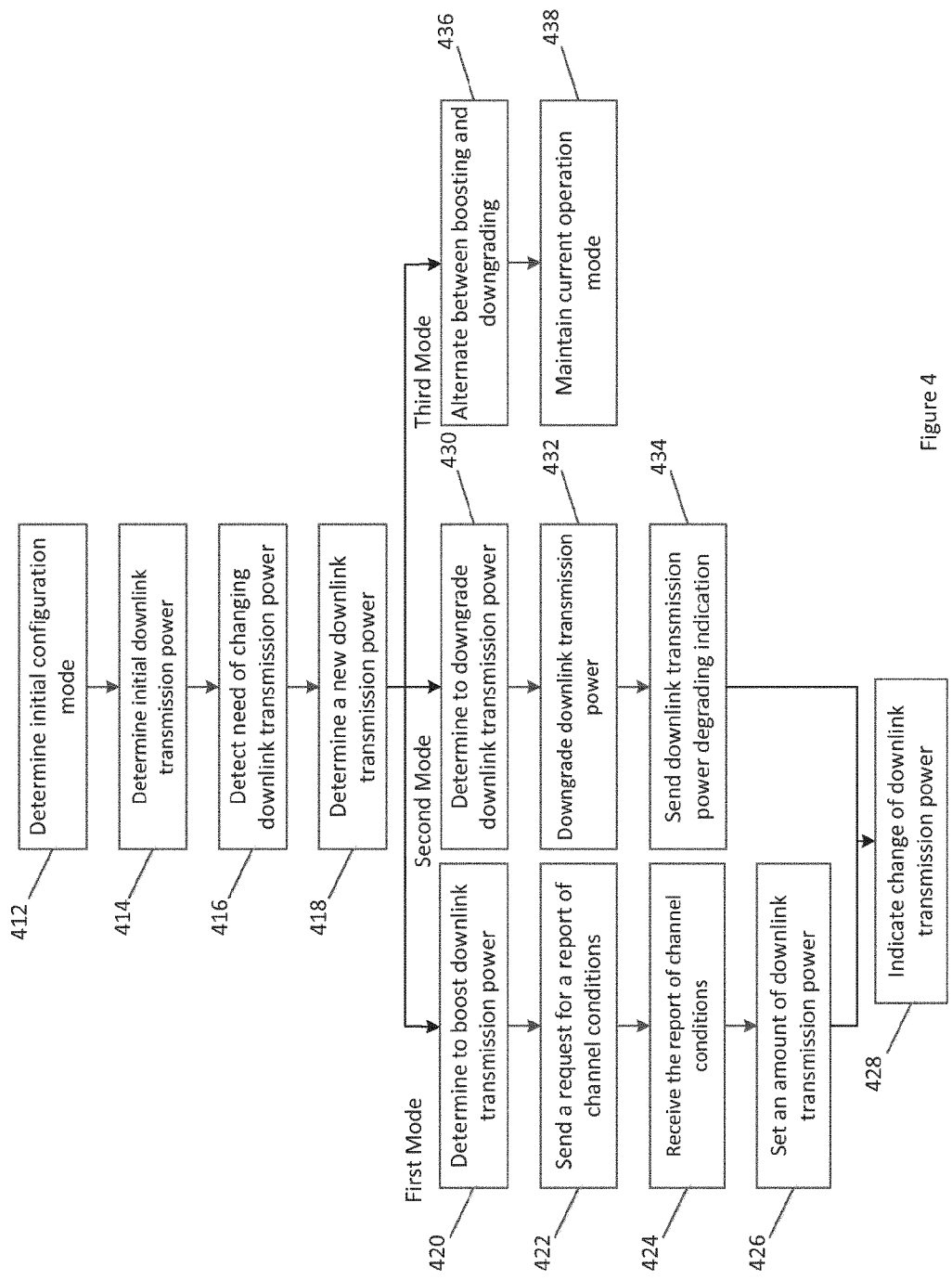
FIG. 4 illustrates a method, according to certain embodiments.

The memory and the computer program instructions can be configured, with the processor for the particular device, to cause a hardware apparatus such as apparatus 210 and network element 220 to perform any of the processes described herein (see, for example, FIGS. 1, 4 and 5). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 2 illustrates a system including an apparatus 210 and network element 220, embodiments of the invention may be applicable to other configurations, and configurations involving additional elements. For example, not shown, additional UEs may be present, as illustrated in FIG. 1, for example.

As mentioned above, according to one embodiment, the system shown in FIG. 2 may include an apparatus 210, and a network element 220, for example. In an embodiment, the network element 220, such as an eNB/NeNB, base station, access point or other similar device, may be controlled by memory 225 and processor 224 to determine an initial configuration mode of the network element for setting up a self-controlled radio access network. The network element 220 may also be controlled by memory 225 and processor 224 to determine an initial downlink transmission power of the network element coupled with the determined initial configuration mode. The network element 220 may further be controlled by memory 225 and processor 224 to detect a need of changing downlink transmission power of the network element based on at least one of traffic demands and conditions of the self-controlled radio access network.

The network element 220 may also be controlled by memory 225 and processor 224 to determine a new downlink transmission power. Further, The network element 220 may be controlled by memory 225 and processor 224 to indicate at least one of the change of downlink transmission power and the initial configuration mode to at least one user equipment.

The network element 220 may also be controlled by memory 225 and processor 224, for example when the network element 220 determines that the initial configuration mode is operating in a first mode such as mode 1 as described above, to determine to boost the downlink transmission power of the network element 220 when the relayed traffic demands are larger than a pre-defined threshold. In an embodiment, the first mode may include a user equipment-to-network relay. In another embodiment, the trigger for changing/boosting the downlink transmission power of the network element may be dependent upon whether the relayed traffic is larger than a pre-defined threshold. The trigger may be cell specific, or the trigger may be the UE-to-network relay UE specific. In yet another embodiment, the amount of relayed traffic may be counted as the overall bit rates or the number of resource blocks for transmitting the traffic. According to an embodiment, the amount of relayed traffic may also be counted as relative to the overall cell capacity.

The network element 220 may further be controlled by memory 225 and processor 224 to send a request to a relay user equipment for a report of conditions of a channel between the relay user equipment and a relayed user equipment, receive the report of channel conditions from the relay user equipment, and set an amount of the downlink transmission power of the network element 220 to be boosted based on the report of channel conditions. In an embodiment, the report may include at least one of information of all relayed user equipment, or information of the relayed user equipment with the worst channel condition or with the highest amount of traffic. In another embodiment, the request may be sent to all the relay user equipment with common control signaling, or to the relay user equipment that relay the highest amount of traffic with dedicated control signaling.

According to an embodiment, the network element 220 may be controlled by memory 225 and processor 224 to establish a direct cell access for communication with a relay user equipment that is in the coverage of the IOPS cell, and provide the IOPS cell access service to a remote UE by allowing it to access the IOPS serving cell or the isolated E-UTRAN via the UE-to-network relayed UE. Or the remote UEs and the UE-to-network relay UEs may use end-to-end Pro-Se direct communication. In another embodiment, the network element 220 may also be controlled by memory 225 and processor 224 to establish the direct cell access communication with the remote user equipment.

In an embodiment, the conditions in the cell may include a number of user equipment in a cell edge. In another embodiment, the network element 220 may be controlled by memory 225 and processor 224, when the network element 220 determines that the initial configuration mode is operating in a second mode such as mode 2 as described above, to determine to downgrade the downlink transmission power of the network element 220 based on the detected number of user equipment in the cell edge. In an embodiment, in the second mode, all the UEs may establish a direct cell access control plane connection with the eNB/NeNB.

Further, in an embodiment, the UEs that established a direct control plane connection with the eNB/NeNB may establish a direct ProSe communication for a user plane connection under the control of the eNB/NeNB. According to an embodiment, the network element 220 may also be controlled by memory 225 and processor 224 to downgrade the downlink transmission power of the network element 220 when the number of user equipment in the cell edge is lower than a pre-configured threshold.

In an embodiment, the network element 220 may further be controlled by memory 225 and processor 224 to downgrade the downlink transmission power of the network element 220 when the network element 220 detects that energy saving may be achieved by the use of relay user equipment features coupled with the need for direct cellular access for the user plane. In an embodiment, the detection may be based on the number of accessed/connected user equipment which have a large uplink timing advance value. For example, the timing advance may be larger than a certain pre-configured threshold. Alternatively, the detection may be based on the number of user equipment that report reference signal received power measurements based on the network element 220 configuration.

In an embodiment, the number of user equipment in the cell edge may be based on a number of accessed or connected user equipment which have a large uplink timing advance value, or a number of user equipment that report reference signal received power measurements based on the network element 220 configuration. In another embodiment, the network element 220 may be controlled by memory 225 and processor 224 to indicate at least one of a downlink transmission power degrading or boosting indication, cell access information and user equipment relay information to at least one user equipment. The UE selection may be based on, for example, the UL timing advance information or RSRP report. Further, the DL Tx power downgrading indication may also include UE-to-network relay UEs information to facilitate the remote UEs to find UE-to-network relay UEs for indirect access via UE-to-network relay UEs.

According to an embodiment, the network element 220 may be controlled by memory 225 and processor 224 to configure one or more UEs that have the direct cell access to the eNB/NeNB to act as UE-to-network relay UEs. In an embodiment, the remote UE may access the IOPS serving cell or the isolated E-UTRAN, via the E-to-network relay UEs for eNB/NeNB involved communication, or have end-to-end direct Pro-Se communication without eNB/NeNB involvement.

According to an embodiment, the network element 220 may be initially configured with a pre-configured minimum downlink transmission power if the first mode is configured, a pre-configured maximum downlink transmission power if the second mode is configured, or a pre-configured downlink transmission power in-between the pre-configured minimum or maximum downlink transmission power if the third mode is configured. According to another embodiment, the initial configuration mode may be determined based on an environment that the network element 220 is operating in.

Further, in an embodiment, the network element 220 may be controlled by memory 225 and processor 224, for example when the network element 220 determines that the initial configuration mode is operating in a third mode such as mode 3 as described above, to alternate between modes 1 and 2. For example, the network element 220 may be configured to alternate between boosting and downgrading the downlink transmission power of the network element 220 when the network element 220 detects that an energy saving is achievable, and configured to maintain the current operation mode in a case of an existing network element having a broken backhaul connection.

Figure 3:
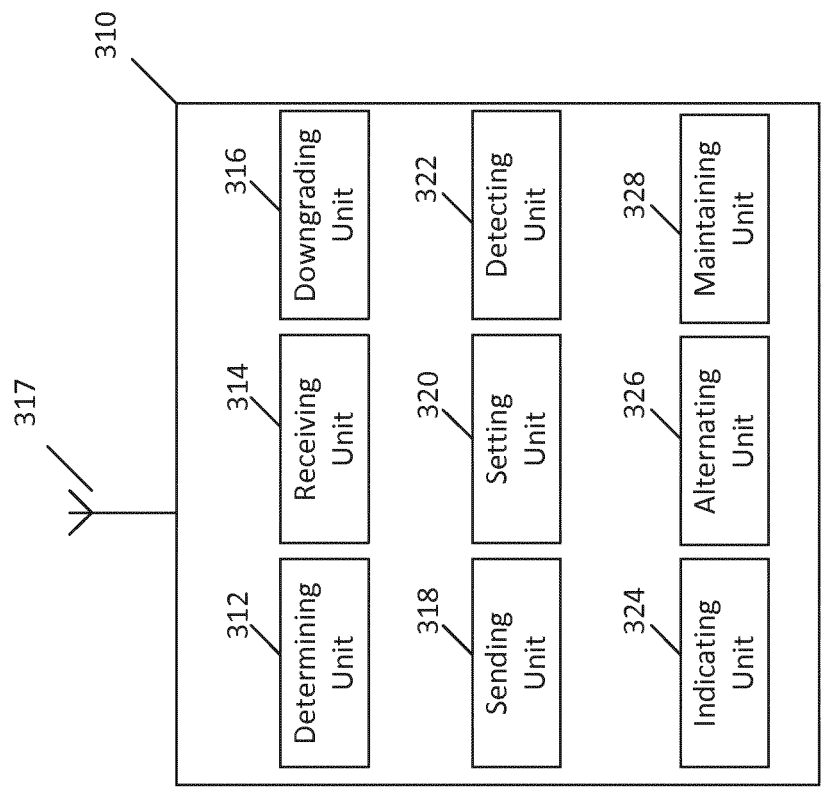
FIG. 3 illustrates an apparatus, according to certain embodiments.

FIG. 3 illustrates an apparatus 310, according to certain embodiments. In one embodiment, the apparatus 310 may be a network element, such as, for example, an eNB/NeNB, discussed above in connection with FIG. 2. It should be noted that one of ordinary skill in the art would understand that apparatus 310 may include components or features not shown in FIG. 3. Additionally, the apparatus 310 may include one or more antennas 317 for transmitting and receiving signals and/or data to and from apparatus 310.

As illustrated in FIG. 3, apparatus 310 may include a determining unit 312 that may be configured to determine an initial configuration mode of a network element for setting up a self-controlled radio access network. The determining unit 312 may also be configured to, determine an initial downlink transmission power of the network element coupled with the determined initial configuration mode. The apparatus 310 may also include a detecting unit 322 that may be configured to detect a need of changing downlink transmission power of the network element based on at least one of traffic demands and conditions of the self-controlled radio access network.

The determining unit 312 of the apparatus 310 may also be configured to determine a new downlink transmission power. Further, the apparatus 310 may include an indicating unit 324 that may be configured to indicate the change of downlink transmission power and the initial configuration mode to at least one user equipment. The determining unit 312 of the apparatus 310 may also be configured, when the initial configuration mode is a first mode, to determine to boost the downlink transmission power of the network element when the traffic demands are larger than a pre-defined threshold. The apparatus 310 may further include a sending unit 318 that may be configured to send a request to a relay user equipment for a report of conditions of a channel between the relay user equipment and a relayed user equipment. The apparatus 310 may also include a receiving unit 314 that may be configured to receive the report of channel conditions from the relay user equipment. The apparatus 310 may further include a setting unit 320 that may be configured to set an amount of the downlink transmission power of the network element to be boosted based on the report of channel conditions.

In an embodiment, the determining unit 312 may also be configured, when the initial configuration mode is a second mode, to determine to downgrade the downlink transmission power of the network element based on the detected number of user equipment in the cell edge. The apparatus 310 may also include a downgrading unit 316 that may be configured to downgrade the downlink transmission power of the network element when the number of user equipment in the cell edge is lower than a pre-configured threshold. In an embodiment, the indicating unit 324 may also be configured to indicate a downlink transmission power degrading indication and user equipment relay information to a remote user equipment.

According to an embodiment, the apparatus 310 may also include, when the initial configuration mode is a third mode, an alternating unit 326 that may be configured to alternate between boosting and downgrading the downlink transmission power of the network element when the network element detects that an energy saving is achievable, include a maintaining unit 328 that may be configured to maintain the current operation mode in a case of an existing network element having a broken backhaul connection.

FIG. 4 illustrates an example of a flow diagram of a method, according to certain embodiments. In an embodiment, the method of FIG. 4 may be performed by a network element, such as an eNB/NeNB, for example. The method may include, at 412, determining an initial configuration mode of a network element for setting up a self-controlled radio access network. The method may also include, at 414, determining an initial downlink transmission power of the network element coupled with the determined initial configuration mode. The method may further include, at 416, detecting a need of changing downlink transmission power of the network element based on at least one of traffic demands and conditions of the self-controlled radio access network. The method may also include, at 418, determining a new downlink transmission power.

The method may further include, at 420, when the initial configuration mode is a first mode, determining to boost the downlink transmission power of the network element when the traffic demands are larger than a pre-defined threshold. The method may also include, at 422, sending a request to a relay user equipment for a report of conditions of a channel between the relay user equipment and a relayed user equipment. The method may further include, at 424, receiving the report of channel conditions from the relay user equipment, and at 426, setting an amount of the downlink transmission power of the network element to be boosted based on the report of channel conditions. The method may also include, at 428, indicating the change of downlink transmission power and the initial configuration mode to at least one user equipment. In an embodiment, indicating the change of downlink transmission power. In an embodiment, the indicating may include indicating at least one of a downlink transmission power degrading or boosting indication, cell access information and user equipment relay information to a user equipment.

The method may also include, at 430, when the initial configuration mode is a second mode, determining to downgrade the downlink transmission power of the network element based on the detected number of user equipment in the cell edge. The method may further include, at 432, downgrading the downlink transmission power of the network element when the number of user equipment in the cell edge is lower than a pre-configured threshold. The method may also include, 428, indicating the change of downlink transmission power. In an embodiment, the indicating may include indicating at least one of a downlink transmission power degrading or boosting indication, cell access information and user equipment relay information to a user equipment.

The method may further include, at 436, when the initial configuration mode is a third mode, alternating between boosting and downgrading the downlink transmission power of the network element when the network element detects that an energy saving is achievable. The method may also include at 438, maintaining the current operation mode in a case of an existing network element having a broken backhaul connection.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Glossary

3GPP 3rd Generation Partnership Project
ASIC Application-Specific Integrated Circuits
CPU Central Processing Unit
D2D Device to Device
DL Downlink
eNB EnodeB
EPC Evolved Packet Core
E-UTRAN Evolved UTRAN
FDD Frequency Division Duplexing
HDD Hard Disk Drive
HMI Human Machine Interface
IOPS Isolated E-UTRAN Operation for Public Safety
IP Internet Protocol
LTE Long Term Evolution
MAC Media Access Control
Mbps Megabits per second
NeNB Nomadic eNB
O&M Operation and Management
PHY Physical Layer
ProSe Proximity Service
PS Public Safety
RAM Random Access Memory
RNC Radio Network Controllers
RNS Radio Network Subsystem
ROM Read Only Memory
RSRP Reference Signal Received Power
TDD Time Division Duplexing
Tx Transmission
UE User Equipment
UMTS Universal Mobile Telecommunications System
UTRAN Universal Mobile Telecommunications System Radio Access Network

We claim:

1. A method, comprising:
   determining an initial configuration mode of a network element for setting up a self-controlled radio access network, wherein determining the initial configuration mode comprises a precondition that the network element relies on mobile battery power, and a loss or limited backhaul connection;
   determining an initial downlink transmission power of the network element coupled with the determined initial configuration mode;
   detecting a need of changing downlink transmission power of the network element based on at least one of traffic demands and conditions of the self-controlled radio access network;
   determining a new downlink transmission power; and
   indicating at least one of the change of downlink transmission power and the initial configuration mode to at least one user equipment.

2. The method according to claim 1, further comprising, when the initial configuration mode is a first mode, determining to boost the downlink transmission power of the network element when the relayed traffic demands are larger than a pre-defined threshold, wherein the first mode comprises a user equipment-to-network relay.

3. The method according to claim 2, further comprising:
   sending a request to a relay user equipment for a report of conditions of a channel between the relay user equipment and a relayed user equipment;
   receiving the report of channel conditions from the relay user equipment; and setting an amount of the downlink transmission power of the network element to be boosted based on the report of channel conditions.

4. The method according to claim 2, wherein the request is sent to all the relay user equipment with common control signaling, or to the relay user equipment that relay the highest amount of traffic with dedicated control signaling.

5. The method according to claim 1,
further comprising, when the initial configuration mode is a second mode, determining to downgrade the downlink transmission power of the network element based on a detected number of user equipment in a cell edge, and
wherein the second mode comprises a direct access to the self-controlled radio access network for a control plane connection and a direct proximity service communication for a user plane connection.

6. The method according to claim 5, further comprising downgrading the downlink transmission power of the network element when the number of user equipment in the cell edge is lower than a pre-configured threshold.

7. The method according to claim 5, wherein the number of user equipment in the cell edge is based on a number of accessed or connected user equipment which have a large uplink timing advance value, or a number of user equipment that report reference signal received power measurements based on the network element configuration.

8. The method according to claim 1, wherein the indicating further comprises indicating at least one of a downlink transmission power degrading or boosting indication, cell access information and user equipment relay information to at least one user equipment.

9. The method according to claim 1, further comprising, when the initial configuration mode is a third mode:
alternating between boosting and downgrading the downlink transmission power of the network element when the network element detects that an energy saving is achievable, and
maintaining the current operation mode in a case of an existing network element having a broken backhaul connection.

10. The method according to claim 1, wherein the network element is initially configured with a pre-configured minimum downlink transmission power if the first mode is configured, a pre-configured maximum downlink transmission power if the second mode is configured, or a pre-configured downlink transmission power in-between the pre-configured minimum or maximum downlink transmission power if the third mode is configured.

11. A computer program, embodied on a non-transitory computer readable medium, the computer program configured to control a processor to perform the method according to claim 1.

12. An apparatus, comprising:
at least one processor; and
at least one memory including computer program code,
wherein the at least one memory and the computer program code are configured, with the at least one processor, to cause the apparatus at least to
determine an initial configuration mode of a network element for setting up a self-controlled radio access network, wherein determining the initial configuration mode comprises a precondition that the network element relies on mobile battery power, and a loss or limited backhaul connection;
determine an initial downlink transmission power of the network element coupled with the determined initial configuration mode;
detect a need of changing downlink transmission power of the network element based on at least one of traffic demands and conditions of the self-controlled radio access network;
determine a new downlink transmission power; and
indicate at least one of the change of downlink transmission power and the initial configuration mode to at least one user equipment.

13. The apparatus according to claim 12, wherein the at least one memory and computer program code are further configured to cause the apparatus, when the initial configuration mode is a first mode, to determine to boost the downlink transmission power of the network element when the relayed traffic demands are larger than a pre-defined threshold, wherein the first mode comprises a user equipment-to-network relay.

14. The apparatus according to claim 13, wherein the at least one memory and the computer program code are further configured to cause the apparatus to:
send a request to a relay user equipment for a report of channel conditions of a channel between the relay user equipment and a relayed user equipment;
receive the report of channel conditions from the relay user equipment; and
set an amount of the downlink transmission power of the network element to be boosted based on the report of channel conditions.

15. The apparatus according to claim 13, wherein the request is sent to all the relay user equipment with common control signaling, or to the relay user equipment that relay the highest amount of traffic with dedicated control signaling.

16. The apparatus according to claim 12, wherein the at least one memory and the computer program code are further configured to cause the apparatus to
determine, when the initial configuration made is a second mode, to downgrade the downlink transmission power of the network element based on a detected number of user equipment in a cell edge, and
wherein the second mode comprises a direct access to the self-controlled radio access network for a control plane connection and a direct proximity service communication for a user plane connection.

17. The apparatus according to claim 16, wherein the at least one memory and computer program code are further configured to cause the apparatus to downgrade the downlink transmission power of the network element when the number of user equipment in the cell edge is lower than a pre-configured threshold.

18. The apparatus according to claim 16, wherein the number of user equipment in the cell edge is based on a number of accessed or connected user equipment which have a large uplink timing advance value, or a number of user equipment that report reference signal received power measurements based on the network element configuration.

19. The apparatus according to claim 12, wherein the at least one memory and computer program code are further configured to cause the apparatus to indicate at least one of a downlink transmission power degrading or boosting indication, cell access information and user equipment relay information to at least one user equipment.

20. The apparatus according to claim 12, wherein the at least one memory and computer program code are further configured to cause the apparatus, when the initial configuration mode is a third mode, alternate between boosting and downgrading the downlink transmission power of the network element when the network element detects that an energy saving is achievable, and maintain the current operation mode in a case of an existing network element having a broken backhaul connection.

21. The apparatus according to claim 12, wherein the network element is initially configured with a pre-configured minimum downlink transmission power if the first mode is configured, a pre-configured maximum downlink transmission power if the second mode is configured, or a pre-configured downlink transmission power in-between the pre-configured minimum or maximum downlink transmission power if the third mode is configured.

\* \* \* \* \*